United States Patent [19]

Yang

[11] Patent Number: 4,562,864
[45] Date of Patent: Jan. 7, 1986

[54] SINGLE HANDLE MIXING VALVE WITH OUTLET SELECTION

[76] Inventor: Tai-Her Yang, 5-1 Tay Pyng St., Shi Hwu Jenn, Jang Huah Shiann, Taiwan

[21] Appl. No.: 547,923

[22] Filed: Nov. 2, 1983

[51] Int. Cl.[4] ............................................. F16K 11/087
[52] U.S. Cl. ................................. 137/597; 137/625.46; 137/636.2; 137/625.41
[58] Field of Search ....................... 137/625.41, 625.46, 137/625.4, 597, 636.2

[56] References Cited

U.S. PATENT DOCUMENTS

| | | | |
|---|---|---|---|
| 1,614,437 | 1/1927 | Cochran | 137/625.41 |
| 2,535,580 | 12/1950 | Kersten | 137/625.41 |
| 2,592,062 | 4/1952 | Perry | 137/625.41 |
| 3,130,750 | 4/1964 | Post | 137/625.41 |
| 3,167,086 | 1/1965 | Michalski | 137/625.41 |
| 3,422,849 | 1/1969 | Manoogian | 137/625.41 |
| 3,472,279 | 10/1969 | Sanderson | 137/625.41 |
| 3,533,436 | 10/1970 | Parkison | 137/625.4 |
| 3,796,231 | 3/1974 | Hare | 137/625.41 |
| 3,823,742 | 7/1974 | VonCorpon | 137/625.41 |
| 3,906,999 | 9/1975 | Manoogian et al. | 137/625.41 |
| 4,043,359 | 8/1977 | Christo | 137/625.41 |
| 4,226,260 | 10/1980 | Schmitt | 137/625.17 |
| 4,352,369 | 10/1982 | Lorch | 137/625.41 |

*Primary Examiner*—Martin P. Schwadron
*Assistant Examiner*—John A. Rivell
*Attorney, Agent, or Firm*—Cushman, Darby & Cushman

[57] ABSTRACT

A liquid mixing valve includes a handle, a protective cover, a semi-circular cover, a spherical guide body, a water-stop washer, and a base defining a spherical cavity therein communicating with dual water outlet ports, a hot-water inlet port and a cold-water inlet port. By moving a handle, a spherical guide body within the spherical cavity is rotated in order to change the registry of a mixing cavity defined within the body with the cold-water and hot-water inlet ports and with the water outlet ports. Hence, the ratio between the portions of at least one of the water outlet ports and the portions of the cold-water and hot-water inlet ports communicating with the outlet port can be controlled to obtain the desired liquid temperature and volume flow rate. By turning the handle 180°, liquid flows from a different one of the outlet ports. In another embodiment, a guide body with dual mixing cavities is provided to permit direct adjustment and selection of output ports by simple longitudinal movement of the handle. In yet another embodiment, a cover of the base defines a rectangular aperture through which the adjustment handle extends. The handle is moved longitudinally to adjust water volume flow rate. Water temperature is adjusted by rotation of the handle, and the outlet port is selected by rotating the handle 180°. The guide body may define dual mixing cavities to permit selection of fluid outlets by simple rectilinear movement of the adjustment handle.

16 Claims, 18 Drawing Figures

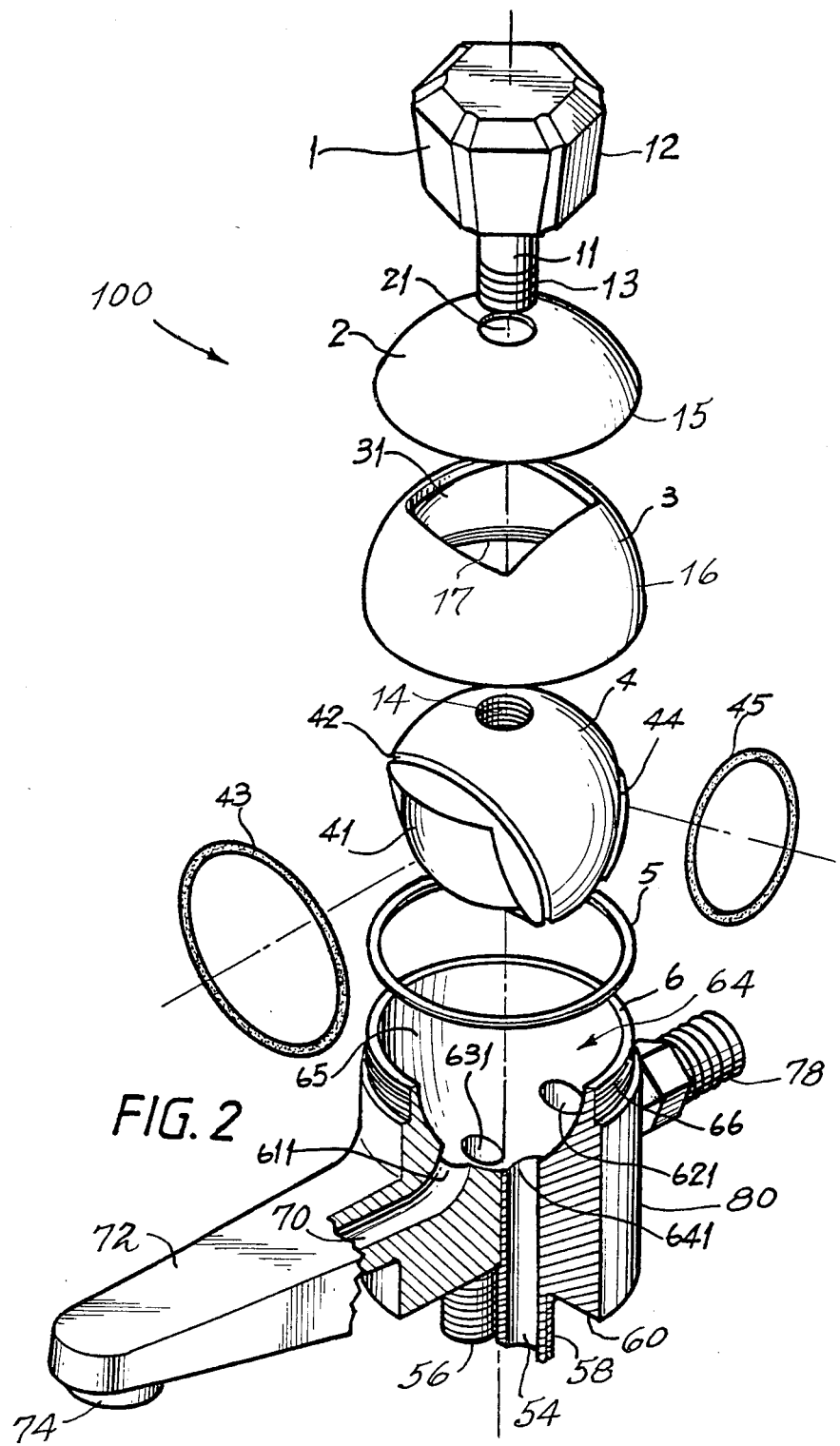

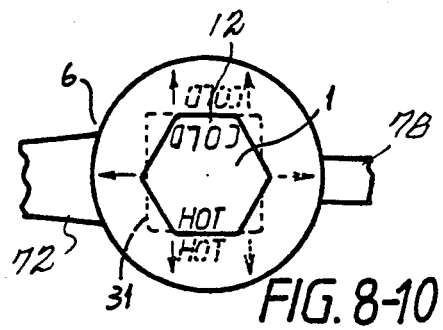
FIG. 8-10
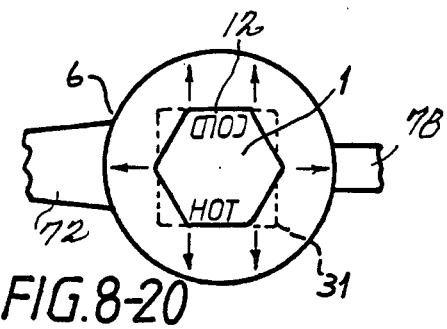
FIG. 8-20
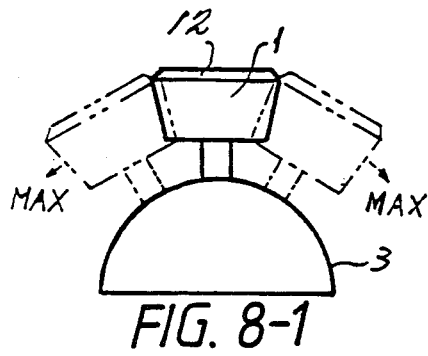
FIG. 8-1
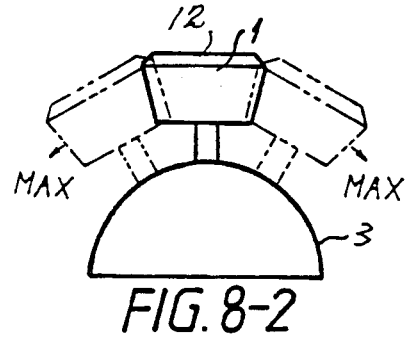
FIG. 8-2
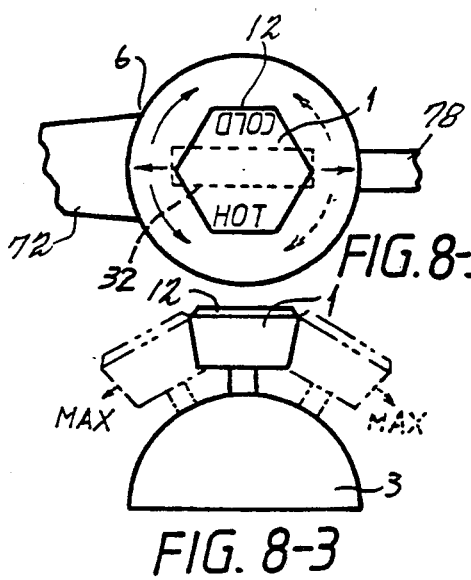
FIG. 8-30
FIG. 8-3
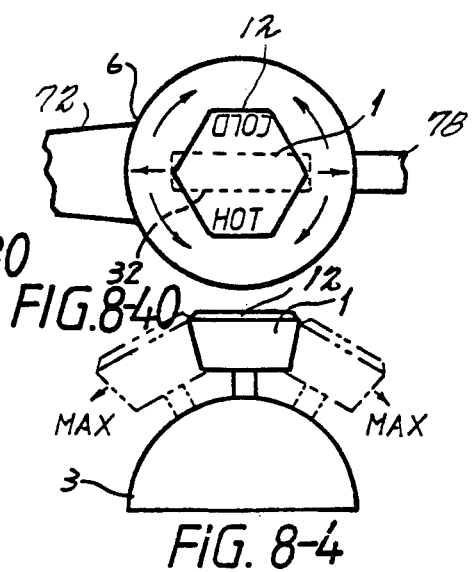
FIG. 8-40
FIG. 8-4

SINGLE HANDLE MIXING VALVE WITH OUTLET SELECTION

BACKGROUND OF THE INVENTION

Although some conventional liquid valves permit control of liquid temperature and volume flow rate by adjustment of a single control handle, they do so at the expense of requiring many components that are hard to manufacture and maintain, and often call for specialized maintenance personnel to perform many required repair and maintenance tasks. Furthermore, in bathroom installations wherein a shower head as well as a bathtub is being supplied with water, an additional water faucet capable of controlling temperature and flow rate of water supplied to the shower head must typically be installed, requiring a rather complicated arrangement which leads to waste of time, money and space.

SUMMARY OF THE INVENTION

The present invention provides a liquid mixing valve which permits selection between output ports, volume flow rate adjustment and liquid temperature adjustment by manipulation of a single handle. A valve guide body is provided with an annular groove into which is disposed an annular seal. The seal encloses an output port of the valve whenever the valve is in the OFF position, thus preventing leakage. In the present invention, the longitudinal movements and latitudinal movements of the single handle of a valve control the water outlet volume flow rate and temperature, while rotation of the handle by 180° causes the liquid to flow from a different outlet of the valve. In accordance with another aspect of the present invention, outlet selection and volume flow rate are selected by simple movement of a handle along a linear path.

BRIEF DESCRIPTION OF THE DRAWINGS

FIG. 2 is an exploded view in perspective of the embodiment shown in FIG. 1;

FIG. 5-1 is a cross-sectional top view in plan of the embodiment shown in FIG. 2 in a first OFF (i.e. zero flow) position;

FIG. 5-2 is a cross-sectional top view in plan of the embodiment shown in FIG. 2 in an ON (i.e. full water supply to a first outlet) position;

FIG. 5-3 is a cross-sectional top view in plan of the embodiment shown in FIG. 2 in a second OFF (i.e. zero water supply) position;

FIG. 5-4 is a cross-sectional top view in plan of a second embodiment in accordance with the present invention having dual mixing cavities in the OFF (zero water supply) position;

FIG. 8-1 is a graphical side view of the position of the handle of the embodiment shown in FIG. 2 taken along line B indicating volume flow rate adjustment and output selection with respect to handle position;

FIG. 8-10 is a graphical top view of the handle of the embodiment shown in FIG. 2 indicating liquid mixing adjustment and output selection with respect to handle position;

FIG. 8-2 is a graphical side view of the position of the handle of the embodiment shown in FIG. 5-4 taken along line B (as shown in FIG. 1) indicating volume flow rate adjustment and output selection with respect to handle position;

FIG. 8-20 is a graphical top view of the handle of the embodiment shown in FIG. 5-4 indicating liquid mixing adjustment and output selection with respect to handle position;

FIG. 8-3 is a graphical side view of the position of the handle of the embodiment shown in FIG. 6 taken along line B (shown in FIG. 1) indicating volume flow rate adjustment and output selection with respect to handle position;

FIG. 8-30 is a graphical top view of the handle of the embodiment of the invention shown in FIG. 6 indicating liquid mixing adjustment and output selection with respect to handle position;

FIG. 8-4 is a graphical side view of the position of the handle of a fourth presently preferred exemplary embodiment of the present invention, having dual mixing cavities as shown in FIG. 7 and the linear handle movement feature of the embodiment shown in FIG. 6, indicating volume flow rate adjustment and output selection with respect to handle position; and FIG. 8-40 is a graphical side view of the position of the handle of the embodiment shown in FIG. 8-4 indicating liquid mixing adjustment and output selection with respect to handle position.

DESCRIPTION OF PREFERRED EMBODIMENTS

Figure 1:
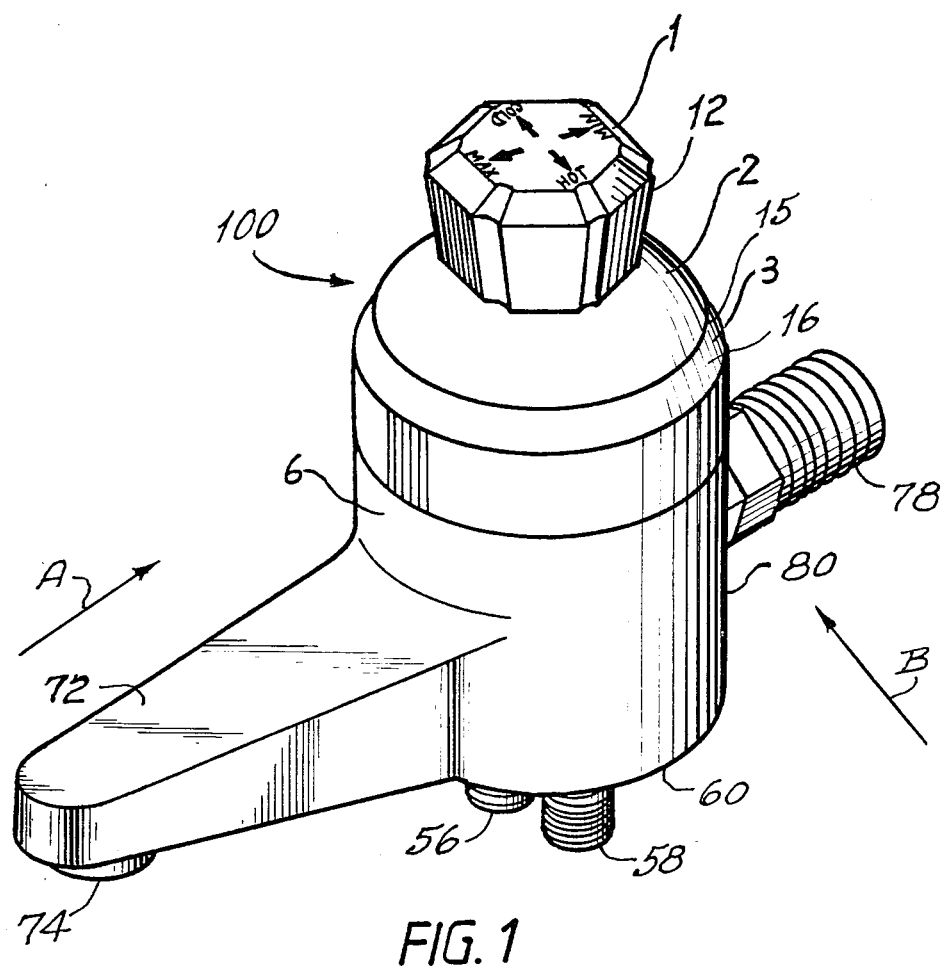
FIG. 1 is a side elevated exterior view in perspective of a presently preferred exemplary embodiment according to the present invention.
Figures 1, 5:
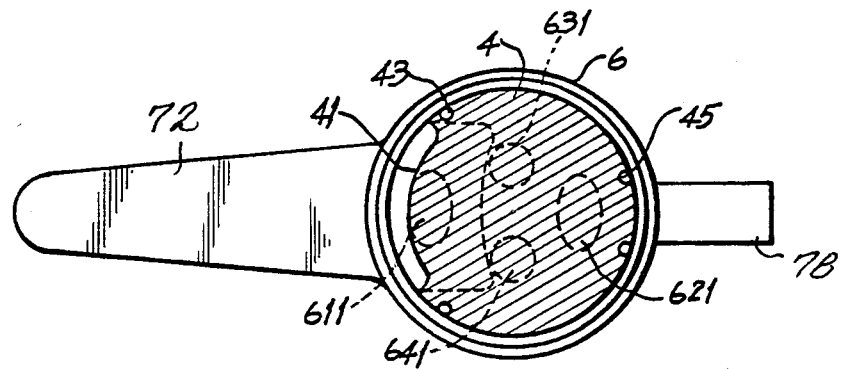
Figures 2, 5:
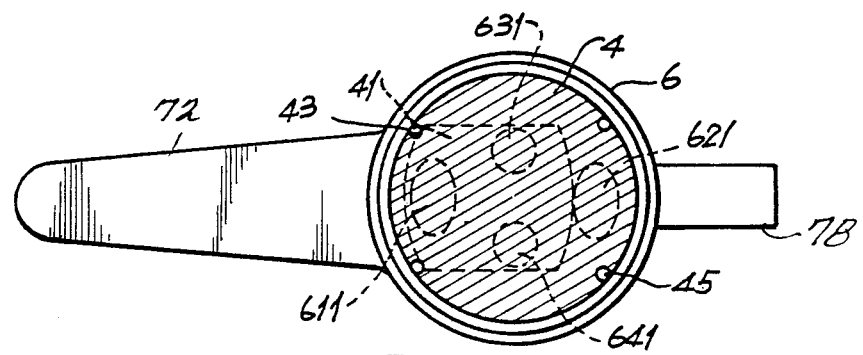
Figures 3, 5:
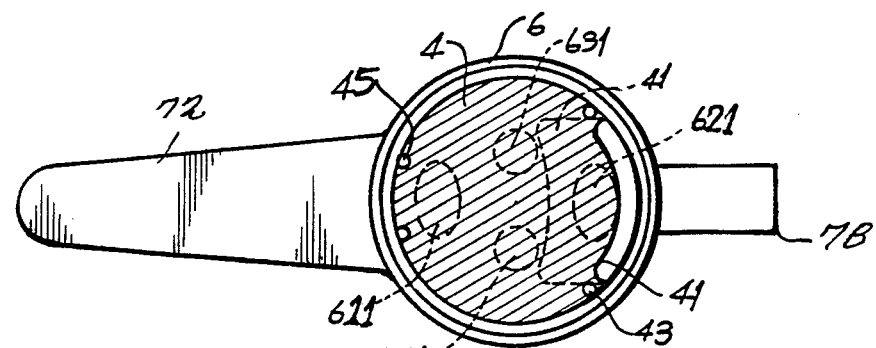

FIGS. 1 and 2 are respectively exterior perspective and exploded perspective views of the presently preferred exemplary embodiment of a liquid mixing valve 100 in accordance with the present invention. Mixing valve 100 includes a handle 1, a protective cover 2, a semi-circular cover 3, a water-guide body 4, a water-stop washer 5 and a base 6. Handle 1 includes a round cylindrical rod 11 fixed to a knurled knob 12. Rod 11 passes through a circular hole 21 defined in protective cover 2 and also passes through a substantially square (rectangular) aperture 31 defined in semi-circular cover 3. An end 13 of rod 11 is threaded and engages with the threaded walls within a cylindrical hole 14 defined in water-guide body 4. Rod 11 of handle 1 is displaceable within square aperture 31, and causes water-guide body 4 to rotate in a direction and amount determined by the displacement of the rod. Hole 21 defined in protective cover 2 has a diameter approximately the same as that of round rod 11 of handle 11. Hole 21 retains and accommodates round rod 11 (which passes therethrough).

An inner rim 15 of protective cover 2 is in close contact with an outer rim 16 of semi-circular cover 3. Protective cover 2 moves with handle 1, and thus slides about the outer rim 16 of cover 3. Protective cover 2 is large enough to completely cover square aperture 31 of cover 3 no matter what position handle 1 is moved to, and thus prevents foreign matter from entering valve 100 through square aperture 31.

Square aperture 31 defined in semi-circular cover 3 has two dimensions: a longitudinal arc length (i.e. the length of the aperture along the circumference of the circle defining the shape of semi-circular cover 3 in the direction of line A shown in FIG. 1); and a latitudinal arc length (i.e. the length of the aperture along the circumference of the circle defining the shape of the semi-circular cover in the direction of line B shown in FIG. 1). As will be explained, the longitudinal and latitudinal arc lengths of aperture 31 bear a predetermined relationship to the spacing and size of inlet and outlet ports defined within base 1.

Figure 4:
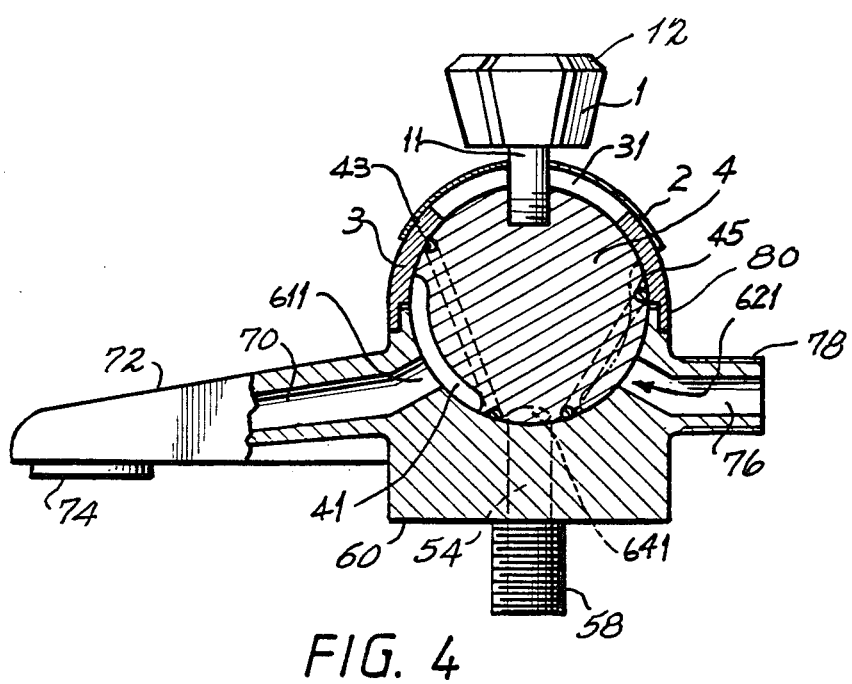
FIG. 4 is a cross-sectional view of the embodiment shown in FIG. 2 viewed along a line B.

Threads provided on inner edge 17 of semi-circular cover 3 engage with threads provided on a top rim 66 of base 6. Spherical water-guide body 4 is disposed in a spherical cavity 65 defined in part by semi-circular cover 3 and in part by base 1. The diameter of water-guide body 4 is approximately the same as that of both the sphere defining the inner surface of semi-circular cover 3 and hemispherical depression 64 defined within base 1. The threaded hole 14 defined in water-guide body 4 is engaged with the threaded end 13 of round rod 11, as mentioned previously, to fixedly attach the rod to the body. Water-guide body 4 is substantially spherical in shape except for a mixing cavity 41 defined in a portion thereof. Mixing cavity 41 is roughly rectangular in shape and extends into body 4 to a substantially uniform depth (as best seen in FIG. 4). Liquid in valve 100 is mixed in the space defined between the walls of the mixing cavity 41 and the walls of hemispherical cavity 64.

Plural inlet and outlet ports are defined in the wall of base 6 defining hemispherical cavity 64. In the preferred embodiment, two inlet ports 631 and 641 and two outlet ports 611 and 621 each communicate with hemispherical cavity 64. Inlet port 631 may communicate with a passage 52 supplying pressurized fluid of a first temperature (e.g. hot water). Inlet port 641 may communicate with a passage 54 supplying pressurized fluid of a second temperature less than the first temperature (e.g. cold water). Passages 52 and 54 are integrally formed in base 6, and are adapted to be connected to conventional pipes supplying pressurized fluid (i.e. by threaded extensions 56 and 58 which extend from a bottom portion 60 of valve 100).

Outlet port 611 communicates with an outlet passage 70 which, in the preferred embodiment, passes through a front spout 72 and terminates in a spout opening 74. Spout opening 74 may be used, for example, to exhaust liquid into a basin or bathtub. Outlet port 621 communicates with an outlet passage 76 which, in the preferred embodiment, is adapted to be connected to a remotely-located spout (e.g. a shower head) not shown via a threaded extension 78 which extends from the rear 80 of valve 100.

There is a relationship in the preferred embodiment between the size of aperture 31 defined in cover 3 and the diameters of port 611, 621, 631 and 641. The length of the arc of the circle defined by the inner surface of cover 3 which spans aperture 31 in the latitudinal direction (i.e. along line B shown in FIG. 1) is slightly greater than the length of the arc between the two most distant points along the circumferences of inlet ports 631 and 641. Likewise, the length of the arc of the circle defined by the inner surface of cover 3 which spans aperture 31 in the longitudinal direction (i.e. along line A shown in FIG. 1) is slightly greater than the length of the arc between the two most distant points along the circumferences of o outlet ports 611 and 621. The dimensions of mixing cavity 41 in the preferred embodiment are slightly larger than the area necessary to simultaneously cover outlet port 611 and the respective inlet ports 631 and 641 defined in base 6, as is shown in FIG. 5-2. Likewise, mixing cavity 41 is large enough to simultaneously communicate with the entire areas of ports 621, 631 and 641.

A relatively large circular groove 42 is defined in body 4 and completely surrounds mixing cavity 41. Groove 42 accommodates and holds a seal ring 43 which prevents liquid present in mixing cavity 41 from escaping except through one of outlet ports 611 and 621. A second circular groove 44 may be defined in body 4. Groove 44 accommodates and holds an annular seal ring 45. As shown in FIG. 4, the distance between the annular seal ring 45 and the annular seal ring 43 must be larger than the diameter of the water inlet ports 631 and 641. Seal rings 43 and 45 provided on water-guide body 4 each can (alternately) prevent the liquid applied to inlet ports 631 and 641 from escaping from cavity 65 except via one of outlet ports 611 or 621. Moreover, when one of seal rings 43 and 45 surrounds one of outlet ports 611 and 621 but does not enclose one of inlet ports 631 or 641, no liquid can escape from the inlet ports to the outlet port (and the valve 100 is thus in the OFF position).

A washer 5 is provided between inner edge 17 of semi-circular cover 3 and rim 66 of base 6 to seal the lower half of cavity 64 (i.e. to prevent liquid from escaping through aperture 31).

Figure 7:
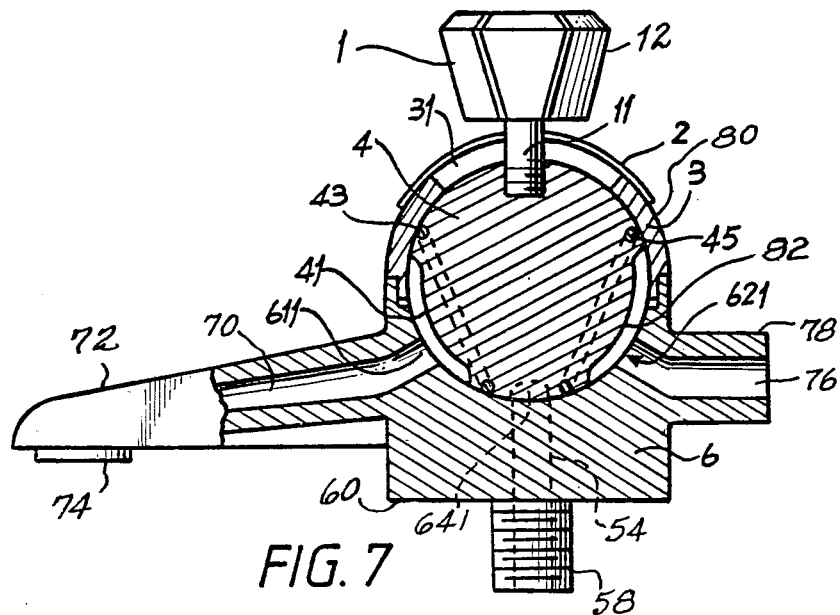
FIG. 7 is a side elevated view in cross-section of the embodiment shown in FIG. 5-4.
Figures 4, 5:
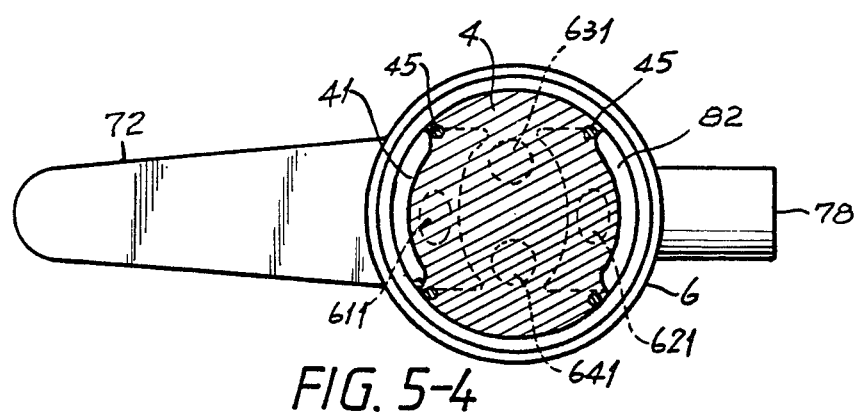

A cross-sectional side view of another embodiment of the present invention including two mixing cavities 41 and 82 is 15 shown in FIG. 7. Mixing cavity 82 is defined in guide body 6 at a position substantially opposing that of mixing cavity 41. Outlet ports 611 and 621 also oppose one another within hemispherical cavity 64. The area of mixing cavity 82 is approximately equal to that of mixing cavity 41. The distance between the sealing ring 45 (surrounding mixing cavity 82) and the sealing ring 43 (surrounding mixing cavity 41) is greater than the diameters of inlet ports 631 and 641. Mixing cavity 41 is in registry with one of outlet ports 611 and 621 in the preferred embodiment whenever mixing cavity 82 is in registry with the other one of the outlet ports. Moreover, mixing cavities 41 and 82 in the preferred embodiment are never simultaneously in registry with inlet ports 631 and 641.

The above description covers the functions, positions and features of various elements of the preferred embodiment of the present invention. The associated positions of handle 1 and associated features and operations of water-guide body 4 together with various water supply conditions of the present invention are portrayed in detail as follows.

FIG. 5-1 is a top cross-sectional view in plan of the position of the embodiment of the present invention shown in FIG. 2 (having only a single mixing cavity 41) in the OFF position. Mixing cavity 41 is in registry with outlet port 611, but not with inlet port 631 or 641. Therefore, no liquid flows from inlet ports 631 or 641. Moreover, outlet port 611 is sealed closed by annular sealing ring 43 in this position. As handle 1 is gradually moved forward (toward spout 72) longitudinally, mixing cavity 41 of water-guide body 4 gradually communicates with greater and greater portions of the cross-sectional areas of inlet ports 631 and 641, causing liquid to flow from the inlet ports to outlet port 611 at an increasing flow rate proportional to handle position. When handle 1 is moved to an extreme limit in the forward longitudinal direction, mixing cavity 41 simultaneously covers the entirety of outlet port 611 and inlet ports 631 and 641 (as is shown in FIGS. 5-2, 8-1, and 8-10). In this latter position, maximum water outlet volume is flowing from spout 72. In other words, the greater the angle handle 1 makes with respect to a straight-up position, the larger the area of inlet ports 631 and 641 that are covered by mixing cavity 41, and the greater the water outlet volume flowing from spout 72 becomes.

When handle 1 is moved to the left of spout 72, mixing cavity 41 moves out of registry with hot-water inlet port 631 and remains in registry only with cold-water inlet port 641 and outlet port 611. The area of hot-water inlet port 631 in registry with mixing cavity 41 is indirectly proportional to the angle of the handle 1 leftward from a center (i.e. straight-up) position. Hence, the temperature of the liquid flowing from spout 72 becomes increasingly colder as handle 1 is moved leftward from its center position. When handle is moved rightward from its center position, the result is just contrary to that of the leftward movement of the handle. The area of cold-water inlet port 641 in registry with mixing cavity 41 is indirectly proportional to the angle of handle 1 rightward of its center position, so that the temperature of the liquid flowing from spout 72 increases as the handle is moved rightward.

Figure 3:
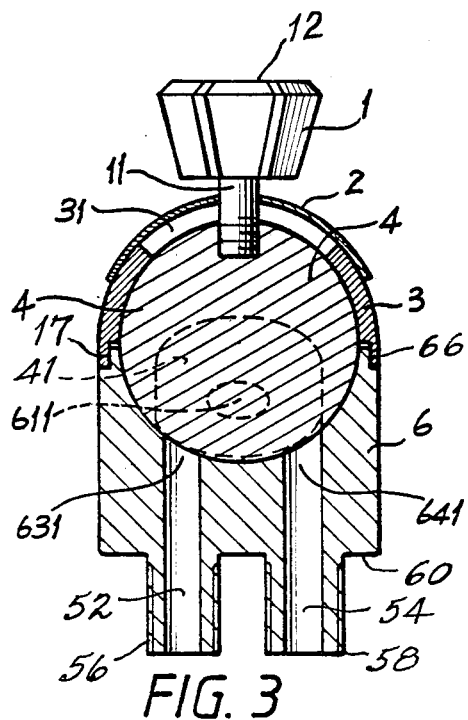
FIG. 3 is a cross-sectional view of the embodiment shown in FIG. 2 viewed along a line A.

When handle 1 is turned 180°, water-guide body 4 also rotates 180° along with its handle 1 (as is shown in FIG. 5-3). Mixing cavity 41 moves out of registry with outlet port 611 and moves into registry with outlet port 621. Hence, liquid now flows from the rear water outlet (i.e. threaded extension 78) of valve 100. When handle 1 is moved longitudinally rearwards (i.e. away from spout 72), the flow rate of liquid flowing through extension 78 increases. To increase the temperature of the flow, as before, handle 1 is displaced rightwards from center. To decrease the temperature flow, the handle 1 is displaced leftwards from center. The greater the angle that the handle is moved from center, the lower (or higher) the temperature of the water flowing from extension 76 becomes, as is shown by the dotted lines in FIGS. 8-1 and 8-10.

Rotation of handle 1 is not necessary to select between outlet ports 611 and 621 in the embodiment having dual mixing cavities 41 and 82 shown in FIG. 7. Instead, the movement of handle 1 in a direction axial to spout 72 controls both selection of outlet ports 611 and 621 and the volume flow rate of liquid flowing through the selected output port (see FIG. 5-4). When handle 1 is moved longitudinally forward, water flows from front water outlet port 611. When handle 1 is moved backward longitudinally, water flows from rear water outlet 612. When handle 1 is moved leftwards of center, the temperature of the water flowing from the selected one of outlet ports 611 and 621 decreases. When handle 1 is moved rightwards from center, the temperature of the water flowing from the selected one of outlet ports 611 and 621 increases.

Figure 6:
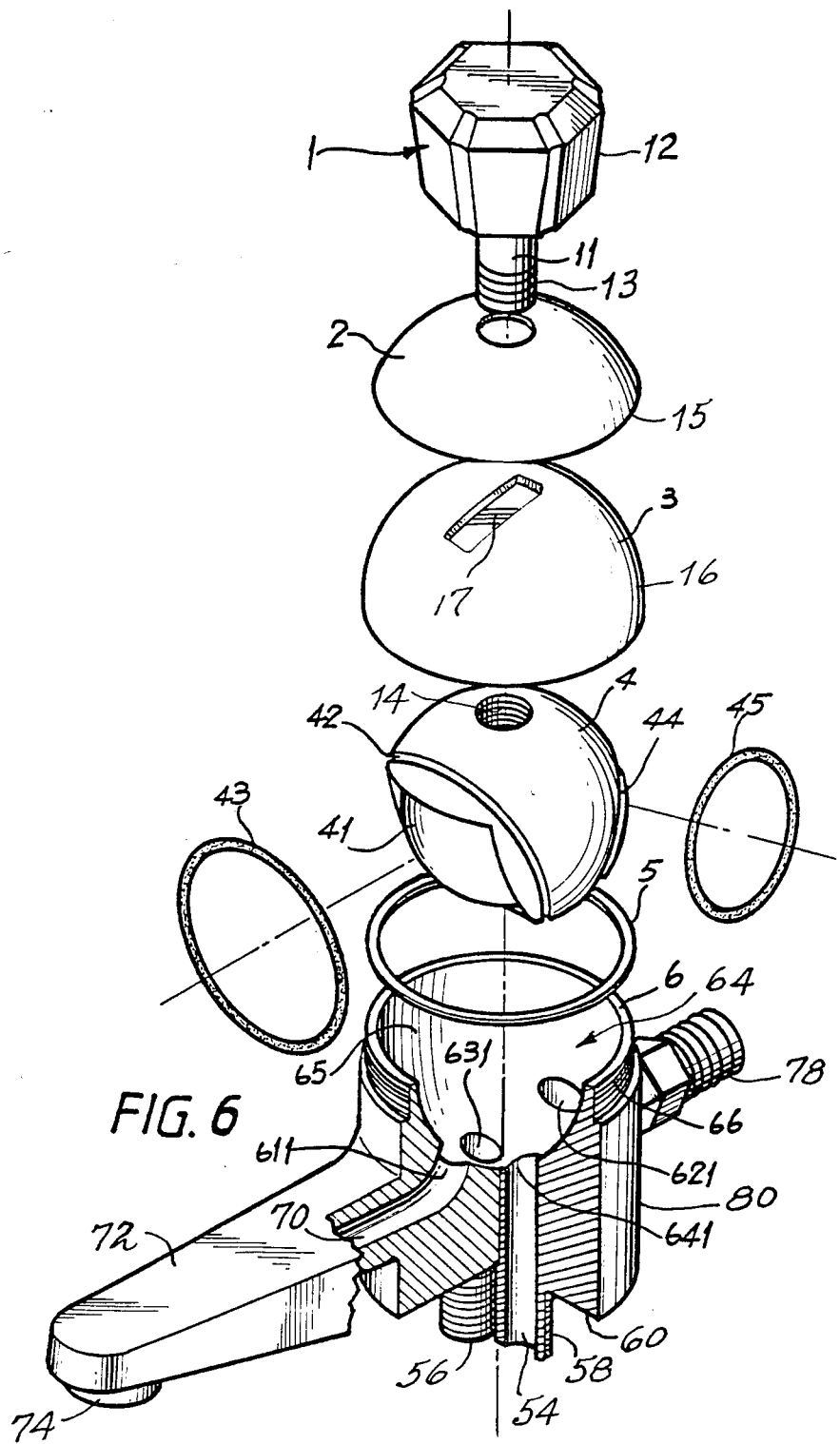
FIG. 6 is an exploded view in perspective of a third presently preferred exemplary embodiment according to the present invention.

FIG. 6 is an exploded perspective view of a second presently preferred exemplary embodiment of the present invention. The principal difference between the embodiment shown in FIG. 2 and the embodiment shown in FIG. 6 lies in the design of the semi-circular cover 3. The semi-circular cover 3 of the embodiment shown in FIG. 6 defines a longitudinal short rectangular slot 32 in lieu of the square aperture 31 of the first embodiment shown in FIG. 2. The width of rectangular slot 32 is slightly larger than the diameter of round rod 11 of handle 1. The length of slot 32 is the same as that of aperture 31 of semi-circular cover 3 of the embodiment shown in FIG. 2. The embodiment shown in FIG. 6 may have a single mixing cavity 41 defined in guide body 4, or it may also have an additional mixing cavity 82 defined in the body, as shown in FIG. 5-4.

The operation and control of the embodiment shown in FIG. 6 is described in detail as follows. When handle 1 is at a center position with respect to slot 32 defined in semi-circular cover 3, valve 100 is in the OFF position and no liquid is supplied to either of outlet ports 611 or 621. When handle 1 is moved forward and longitudinally along rectangular slot 32 (i.e. toward spout 72), mixing cavity 41 moves into registry with inlet ports 631 and 641 while remaining in registry with front water outlet ports 611, and the rate of liquid flow through spout 72 increases. As shown in FIG. 5-2, when handle 1 is moved forward to an extreme (limiting) position, mixing cavity 41 is in registry with the entire cross-sectional areas of inlet ports 631 and 641 and the entire cross-sectional area of outlet port 611, and the water volume flow rate through port 72 is at a maximum. As is shown in FIGS. 8-3 and 8-30, when handle 1 is rotated in a clockwise direction, mixing cavity 41 moves out of registry with hot-water inlet port 631, and the temperature of the water flowing from spout 72 decreases. When handle 1 is moved 90° clockwise, mixing cavity 41 moves entirely out of registry with hot-water inlet port 631, and the temperature of the water flowing from spout 72 is at a minimum. When handle 1 is turned counterclockwise, mixing cavity 41 moves out of registry with cold-water inlet port 641, and the temperature of the water flowing from spout 72 increases. When handle 1 is turned 90° counterclockwise, the temperature of the water flowing spout 72 equals that of the incoming pressurized hot water supplied to inlet port 631. When handle 1 is rotated 180°, body 4 rotates 180° along with handle 1, and accordingly, mixing cavity 41 moves out of registry with front water outlet port 611 and moves into registry with rear water outlet port 621. In this new position, moving handle 1 backward and longitudinally causes the water outlet flow volume flowing out of extension 78 to increase. As shown by the dotted lines in FIGS. 8-3 and 8-30, the more handle 1 is turned clockwise, the lower the temperature of the water flowing from valve 100 gradually becomes. Likewise, the more handle 1 is rotated counterclockwise, the higher the temperature of the water flowing from valve 100 becomes. When handle 1 is rotated 90° counterclockwise, the temperature of the water flowing from outlet port 621 is the same as that of the pressurized hot water supplied to inlet port 631.

As is shown in FIG. 5-4, body 4 the embodiment including slot 32 may define dual mixing cavities 41 and 82. In this embodiment, when handle 1 is moved longitudinally either forward or backward, the rate of flow from valve 100 increases. When handle 1 is moved longitudinally forward (i.e. towards spout 72), liquid flows from front water outlet port 611 (the greater the angle of handle 1 from center, the greater the flow rate becomes). If handle 1 is moved longitudinally backward (i.e. away from spout 72), water flows from rear water outlet port 621 (the greater the angle of handle 1 is moved from center, the greater the flow rate becomes). When handle 1 is moved forward and rotated clockwise, the temperature of the liquid flowing from valve 100 increases. If handle 1 is rotated counterclockwise, the temperature of the liquid flowing from valve 100 decreases. When handle 1 is moved rearward and turned counterclockwise, the temperature of liquid flowing from valve 100 increases. If handle 1 is rotated clockwise, the temperature of the liquid flowing from valve 100 decreases. These control features are shown in FIGS. 8-4 and 8-40.

I claim:

1. A valve for mixing a first fluid with a second fluid, comprising:

means for defining a spherical cavity;

means for defining a first inlet port communicating with said spherical cavity for injecting a first fluid into said cavity;

means for defining a second inlet port communicating with said spherical cavity for injecting a second fluid into said cavity;

means for defining a first outlet port communicating with said spherical cavity for discharging liquid from said cavity;

means for defining a second outlet port communicating with said spherical cavity for discharging liquid from said cavity;

spherical guide body means for mixing said first and second injected fluids, said body means including means for defining at least one mixing cavity therein and means for defining a first substantially annular groove surrounding said mixing cavity;

first seal means, disposed in said first groove, for preventing fluid from escaping from said spherical cavity through said first outlet port when said mixing cavity is in registry with said first outlet port but not with either of said first and second inlet ports; and handle means, connected to said guide body means, for selectively moving said mixing cavity alternately in registry with said first and second outlet ports, and for selectively moving said mixing cavity in registry with controllable portions of the areas of said first and/or second inlet ports.

2. A valve as in claim 1 wherein:

said guide body means further includes means for defining a second substantially annular groove, said second groove surrounding said second outlet port whenever said mixing cavity is in registry with said first outlet port; and said valve further includes second seal means, disposed in said second groove, for selectively preventing liquid from escaping from said spherical cavity through said second outlet port.

3. A valve as in claim 2 wherein said guide body means further includes means for defining a second mixing cavity not in communication with said first mixing cavity, said second mixing cavity surrounded by said second annular slot, said second mixing cavity being in registry with said second outlet port whenever said first mixing cavity is in registry with said first outlet port, said first and second mixing cavities being alternately in registry with said first and/or second inlet ports.

4. A valve as in claim 1 wherein said guide body means further includes means for defining a second mixing cavity not in communication with said first mixing cavity, said second mixing cavity being in registry with said second outlet port whenever said first mixing cavity is in registry with said first outlet port, said first and second mixing cavities being alternately in registry with said first and/or second inlet ports.

5. A valve as in claim 4 wherein said handle means is manipulatable to move continuously along a first linear path between first and second positions, said first mixing cavity being in registry with said first outlet port and at least one of said first and second inlet ports when said handle means is moved to said first position, said second mixing cavity being in registry with said second outlet port and at least one of said first and second inlet ports when said handle means is moved to said second position, neither of said first and second mixing cavities being in registry with either of said first and second inlet ports when said handle is moved to a predetermined center position between said first and second positions, movement of said handle means between said center position and said first position simultaneously changing the portion of the areas of said first and second inlet ports communicating with said first mixing cavity, movement of said handle means between said center position and said second position simultaneously changing the area of said first and second inlet ports communicating with said second mixing cavity.

6. A valve as in claim 5 wherein said handle means is also manipulatable to rotate, rotation of said handle means changing the ratio of the area of said first inlet port communicating with one of said first and second mixing cavities to the area of said second inlet port communicating with said one mixing cavity.

7. A valve as in claim 5 wherein said handle means is also manipulatable to move continuously along a second linear path perpendicular to said first linear path between at least third and fourth positions, movement of said handle means along said second linear path changing the ratio of the area of said first inlet port communicating with one of said first and second mixing cavities to the area of said second inlet port communicating with said one mixing cavity.

8. A valve as in claim 1 wherein said handle means is manipulatable to move continuously along a first linear path between first and second positions and to rotate, rotation of said handle means selecting the one of said first and second outlet ports in registry with said first mixing cavity, movement of said handle means along said linear path between said first and second positions simultaneously changing the portion of the areas of said first and second inlet ports communicating with said first mixing cavity.

9. A valve as in claim 8 wherein:

rotation of said handle means to said first position causes said first mixing cavity to be in registry with said first outlet port;

rotation of said handle means to a second position causes said first mixing cavity to be in registry with said second outlet port; and rotation of said handle means between said first and second positions changes the ratio of the portion of the area of said first inlet port communicating with said first mixing cavity to the portion of the area of said second inlet port communicating with said first mixing cavity.

10. A valve as in claim 8 wherein said handle means is also manipulatable to move continuously along a second linear path perpendicular to said first linear path between at least third and fourth positions, movement of said handle means along said second linear path changing the ratio of the area of said first inlet port communicating with said first mixing cavity to the area of said second inlet port communicating with said first mixing cavity.

11. A valve as in claim 1 wherein said spherical cavity defining means includes:
   base means for defining a lower hemispherical cavity, said inlet and outlet ports communicating with said lower cavity;
   hemispherical cover means for defining an upper hemispherical cavity;
   means for engaging said cover means with said base means; and
   seal ring means, disposed within said cover means, for preventing liquid in said lower hemispherical cavity from escaping into said upper hemispherical cavity.

12. A valve as in claim 11 wherein said cover means includes means for defining a substantially rectangular aperture, said handle means connecting to said guide means through said aperture.

13. A valve as in claim 12 wherein said rectangular aperture has a first dimension slightly larger than the combined lengths of the diameters of said first and second inlet ports added to the distance between said first and second inlet ports.

14. A valve as in claim 11 wherein said cover means includes means for defining a substantially linear slot, said handle means connecting to said guide body means through said slot.

15. A valve as in claim 14 wherein the length of said slot is greater than the combined lengths of the diameters of said first and second inlet ports added to the distance between said first and second inlet ports.

16. A valve as in claim 1 wherein said guide body is substantially solid.

* * * * *